United States Patent
Glavas et al.

(10) Patent No.: US 12,244,005 B2
(45) Date of Patent: Mar. 4, 2025

(54) SECONDARY PARTICLE FOR A CATHODE OF A SECONDARY LITHIUM BATTERY CELL AND METHOD FOR PRODUCING SUCH A PARTICLE

(71) Applicant: VOLKSWAGEN AKTIENGESELLSCHAFT, Wolfsburg (DE)

(72) Inventors: Vedran Glavas, Wolfsburg (DE); Julian Koopmann, Braunschweig (DE); Jonathan Mueller, Gifhorn (DE); Stéphane Brice Olouou Guifo, Wolfsburg (DE); Julian Wegener, Wolfsburg (DE); Marco Wiethop, Wolfenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 552 days.

(21) Appl. No.: 17/738,841

(22) Filed: May 6, 2022

(65) Prior Publication Data

US 2022/0359865 A1 Nov. 10, 2022

(30) Foreign Application Priority Data

May 10, 2021 (DE) .................. 10 2021 204 702.5

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/382* (2013.01); *H01M 2004/021* (2013.01);
(Continued)

(58) Field of Classification Search
None
See application file for complete search history.

(56) References Cited

U.S. PATENT DOCUMENTS

| 10,573,886 B2 | 2/2020 | Muramatsu et al. |
| 2016/0049647 A1* | 2/2016 | Park ............... H01M 4/131 |
| | | 429/209 |
| 2020/0058937 A1 | 2/2020 | Kim et al. |

FOREIGN PATENT DOCUMENTS

| DE | 10 2019 218 487 A1 | 6/2021 |
| EP | 3 723 175 A1 | 10/2020 |

(Continued)

OTHER PUBLICATIONS

Ju Xiaokang et al., "Surfactant-Assisted Synthesis of High Energy {010} Facets Beneficial to Li-Ion Transport Kinetics with Layered LiNi 0.6 o 0.2 Mn 0.2 o 2", ACS Sustainable Chemistry & Engineering, vol. 6, No. 5, Apr. 2, 2018, pp. 6312-6320, XP055776063, US.

(Continued)

*Primary Examiner* — Wyatt P McConnell
(74) *Attorney, Agent, or Firm* — PEARL COHEN ZEDEK LATZER BARATZ LLP (57) ABSTRACT

The invention relates to a secondary particle for a cathode of a secondary lithium battery cell that comprises a plurality of primary particles, each having a layered crystalline structure in which transition metal oxide layers and lithium layers alternate. Each of the primary particles has a spatial extension in the direction of its crystallographic c-axis that is greater than in a direction perpendicular to this axis. The invention also relates to a method for producing such a particle.

11 Claims, 3 Drawing Sheets

(51) Int. Cl.
H01M 4/02 (2006.01)
H01M 4/505 (2010.01)
H01M 4/525 (2010.01)

(52) U.S. Cl.
CPC ...... *H01M 2004/028* (2013.01); *H01M 4/505* (2013.01); *H01M 4/525* (2013.01)

(56) References Cited

FOREIGN PATENT DOCUMENTS

| WO | WO 2019/216694 A1 | 2/2002 |
| WO | WO 2021/104984 A1 | 6/2021 |

OTHER PUBLICATIONS

Jun Tian et al., "High-Rate and Cycling-Stable Nickel-Rich Cathode Materials with Enhanced Li + Diffusion Pathway", Applied Materials & Interfaces, vol. 8, No. 1, Dec. 24, 2015, pp. 582-587, XP055441933, US.
Search Report for European Patent Application No. EP 22 17 0301, mailed Oct. 21, 2022.
Search Report for German Patent Application DE 10 2021 204 702.5, mailed Nov. 17, 2021.

* cited by examiner

SECONDARY PARTICLE FOR A CATHODE OF A SECONDARY LITHIUM BATTERY CELL AND METHOD FOR PRODUCING SUCH A PARTICLE

CROSS REFERENCE TO RELATED APPLICATION

This application claims priority from German Patent Application DE 10 2021 204702.5, filed May 10, 2021, which is hereby incorporated by reference in its entirety.

FIELD OF THE INVENTION

The invention relates to a secondary particle for a cathode of a lithium battery cell. Here, the secondary particle comprises a plurality of primary particles, each having a layered crystalline structure in which transition metal oxide layers and lithium layers alternate. The invention also relates to a method for producing such a particle.

BACKGROUND OF THE INVENTION

A lithium battery cell (Li battery cell), which will also be referred to below simply as a battery cell, usually has an anode and a cathode.

Typically, the anode and the cathode each comprise a substrate, especially a metal foil, also referred to as a current collector, whereby the substrate is provided with a coating. This coating comprises an active material as well as advantageously a binder and a conductive agent such as, for instance, graphite or conductive carbon black. In particular, graphite, graphene, so-called hard carbon nanotubes or soft carbon nanotubes are used as the active material for the anode.

In particular, the (cathode) active material for the cathode has a plurality of secondary particles which, in turn, are made up of a plurality of agglomerated primary particles. Such primary particles can have a layered crystalline structure in which transition metal oxide layers and layers of lithium ions (lithium layers) alternate.

U.S. Pat. Appln. No. 2020/0058937 A1 discloses a precursor for a nickel-based active material for a lithium battery. It comprises a secondary particle with a plurality of particle structures which each have a porous core portion and a shell portion. A plurality of those primary particles of the shell portion, which constitutes the surface of the secondary particle, is arranged here in such a way that the major direction of extension is arranged perpendicular to the surface of the secondary particle. Here, the (110) crystal plane of the primary particles is oriented perpendicular to the major direction of extension.

European patent EP 3 723 175 A1 describes an active material with a secondary particle comprising agglomerated primary particles. Here, the primary particles are elongated in a direction from an interior portion of the secondary particle to a surface portion of the secondary particle. In this case, the crystallographic a-axis corresponds essentially to this direction.

The invention is based on the objective of putting forward a very suitable secondary particle as well as a method for producing such a particle. In particular, the greatest possible diffusion coefficient for the diffusion of the Li-ions in the secondary particle is to be attained. Moreover, a cathode for a lithium battery cell, said cathode having such a secondary particle, as well as a secondary lithium battery cell having such a cathode, are to be put forward.

SUMMARY OF THE INVENTION

The objective is achieved according to the invention by the features of claims regarding the secondary particle. The objective is achieved by the features of claims regarding the cathode and regarding the lithium battery cell respectively. The objective is achieved according to the invention by the features of claims regarding the method. Advantageous embodiments and refinements are the subject matter of the subordinate claims. The explanations given in conjunction with the secondary particle can also be correspondingly applied to the method as well as to the cathode and to the lithium battery cell and vice versa.

The secondary particle is intended for a cathode of a secondary lithium battery cell, especially a lithium ion battery cell. In particular, an active material of the cathode is formed on the basis of the secondary particle. The secondary particle is especially suitable to be used as a cathode active material.

The secondary particle, in turn, has a plurality of primary particles. In particular, the primary particles are agglomerated to form the secondary particle. In a suitable manner, the primary particles each have a monocrystalline configuration.

Each of the primary particles has a layered crystalline structure in which transition metal oxide layers and lithium layers, that is to say, layers of lithium ions, alternate. In other words, layers of lithium ions and layers of a transition metal oxide are arranged alternately one above the other. In yet other words, a layer of lithium ions is arranged between two transition metal oxide layers in each case.

The primary particles are suitably made of a lithium transition metal oxide, for example, lithium-nickel-manganese-cobalt oxide (Li-NMC), lithium-nickel-cobalt-aluminum oxide (NCA), lithium-nickel oxide, lithium-cobalt oxide (LCO), or at least contain these.

The transition metal oxide layers span the basal a-b planes of the crystal lattice. Consequently, the transition metal oxide layers are each arranged in a plane spanned by the crystallographic a-axis and the crystallographic b-axis of the unit cell.

In particular, the transition metal oxide layers and the lithium layers are oriented perpendicular to the crystallographic c-axis. Thus, the transition metal oxide layers and the lithium layers are arranged one above the other in the direction of the c-axis.

Each of the primary particles has a spatial extension in the direction of its crystallographic c-axis that is greater than its spatial extension in a direction perpendicular to the c-axis. Thus, the special extension of the appertaining primary particle along the crystallographic a-axis is greater than its spatial extension in a plane spanned by the crystallographic a-axis and the crystallographic b-axis.

The primary particles are thus each elongated, that is to say, they have a lengthwise configuration. The direction in which the appertaining primary particle is elongated is referred to as the major direction of extension.

Consequently, the portion of the major direction of extension along the crystallographic c-axis is always greater than the portion of the major direction of extension along a direction that is oriented parallel to the a-b crystal plane.

Due to its layered structure, each of the primary particles has anisotropic properties in terms of their diffusion properties. Thus, especially a crystal volume diffusion of the lithium ions (Li-ions) takes place considerably faster in the a-b crystal plane than in the direction of the crystallographic c-axis.

In comparison to the above-mentioned primary particles, which are elongated in the a-b crystal plane, a diffusion path of the lithium ions within the primary particles, especially in the a-b crystal planes, is relatively small due to the elongated shape in the direction of the crystallographic c-axis. Furthermore, the portion of (100) and (010) crystal surfaces, in other words, surfaces of the crystal that are oriented perpendicular to the a-b crystal plane, is relatively large. For this reason, a surface through which the lithium ions intercalate into the primary particle or de-intercalate out of it is enlarged. A grain boundary diffusion of the lithium ions takes place faster than in comparison to the crystal volume diffusion. In particular, the relatively slow crystal volume diffusion is overcompensated for by the relatively short diffusion paths in the appertaining a-b crystal plane. Thus, all in all, this especially advantageously allows a faster lithium ion transport in the secondary particle. The diffusion coefficient for the diffusion of the lithium ions in the secondary particle is thus advantageously relatively high.

Accordingly, a cathode or a battery cell whose cathode has such secondary particles as its active material advantageously has a relatively high power and energy density.

For example, the secondary particle—along with the secondary particles described above—has additional, conventional primary particles, known from the state of the art, that are, for example, spherical or elongated in a direction parallel to the a-b crystal plane. These additional, conventional primary particles are referred to below as "additional primary particles" in order to make a better distinction from the above-described primary particles, whose extension in the direction of the crystallographic c-axis is greater than in a direction perpendicular to this axis.

In other words, the secondary particle does not have to contain exclusively the primary particles according to the invention, but instead, conventional primary particles, that is to say, additional primary particles, can be admixed and/or contained in the secondary particle. Preferably, the portion of the primary particles according to the invention, that is to say, particles whose extension in their crystallographic c-axis is greater than in a direction perpendicular thereto, constitutes at least 50% of all of the primary particles.

According to a suitable embodiment, the spatial extension of the primary particles in the direction of the crystallographic c-axis is at least 1.2 times, especially at least 1.2 times, advantageously at least two times the extension of the primary particle in a direction perpendicular to this axis. In this manner, the portion of (100) and (010) crystal surfaces through which the lithium ions can intercalate into the primary particle or can de-intercalate out of it is advantageously relatively large.

For example, the crystallographic c-axis is slanted relative to the major direction of extension of the appertaining primary particle, with the proviso that the extension in the direction of its crystallographic c-axis is greater than in a direction perpendicular thereto. In a preferred embodiment, however, the crystallographic c-axis is parallel to the major direction of extension of the appertaining primary particle. In this manner, the portion of (100) and (010) crystal surfaces through which the lithium ions can intercalate into the primary particle or can de-intercalate out of it is advantageously further increased.

Fundamentally, the primary particles can have different geometric shapes. For example, the primary particles are each pyramidal, cylindrical or prismatic. Furthermore, the primary particles are, for example, an ellipsoid or they are cuboidal.

Advantageously, the transition metal oxide layers comprise nickel, especially nickel ions, in order to increase the capacity of the battery cell. For example, the nickel content is at least 50 mol %, preferably at least 75 mol %, especially preferably at least 90 mol %, relative to all of the transition metal ions in the transition metal oxide layers.

For example, the orientation of the primary particles—and thus the orientation of the c-axis of the appertaining primary particle—in the secondary particle is random. According to an advantageous refinement, however, at least the majority of the primary particles, that is to say, more than 50% of the primary particles, especially in a shell region of the secondary particle, in other words, in a circumferential region of the secondary particle, are morphologically radially oriented. In this context, the term "morphologically radially oriented" (or below also referred to in short as radially oriented) is to be understood to mean that the major direction of extension and/or the crystallographic c-axis of the appertaining primary particle, starting from a core or a center of the especially spherical or ellipsoidal secondary particle, is oriented towards an outer edge of the secondary particle. This has the advantage that the grain boundaries of the primary particles run radially, so that lithium ions can diffuse relatively quickly into the interior of the secondary particle. As an alternative or in addition to this, the primary particles are arranged next to each other linearly or in the circumferential direction of the especially spherical or ellipsoidal secondary particle, whereby the crystallographic c-axes of the primary particles are oriented parallel to each other, along the circumferential direction of the secondary particle or parallel to the radial direction of the secondary particle. As an alternative to this, adjacent primary particles are arranged offset relative to each other in this radial direction. The different arrangements differ here especially in terms of the size and structure, that is to say, in terms of the network, in terms of the grain boundaries and, associated with this, in terms of the lithium ion diffusion along the grain boundaries. Advantageously, depending on the selected material, the size of the primary particles, their aspect ratio or the like, the arrangement of the primary particles can be selected in such a way as to achieve an effective Li-ion diffusion along the grain boundaries.

The orientation can be influenced especially by the selection of process parameters, for example, a stirring speed or a temperature during the calcination, or else a particle size of the precursor particles.

According to a suitable configuration, the primary particles have a (maximum) spatial extension between 50 nm and 5 µm, for instance, between 100 nm and 3 µm, especially between 250 nm and 1 µm. In particular, the spatial extension of the appertaining primary particle along its major direction of extension is between 50 nm and 5 µm.

Such "medium-sized" primary particles—as compared to larger primary particles—have a larger grain boundary network, which is why lithium ions can diffuse relatively quickly into the interior of the secondary particle. However, in comparison to smaller primary particles, a relatively large quantity of material (bulk material) is also present for the intercalation of the lithium ions.

Another aspect of the invention relates to a cathode for a secondary lithium battery cell. Here, the cathode comprises a secondary particle, advantageously a plurality of secondary particles, that is/are configured according to one of the variants described above. Here, the secondary particle(s)

serves/serve as cathode active material. In particular, the secondary particle(s) is/are a constituent of a coating of the cathode that is applied onto a substrate.

Another aspect of the invention relates to a secondary lithium battery cell. The secondary lithium battery cell is, for example, a lithium ion battery cell with a liquid electrolyte that advantageously contains lithium ions, or else, for example, a so-called solid-state lithium battery cell, in which the electrolyte is solid. According to the invention, it comprises a cathode that is configured according to the variant described above. Such a secondary lithium battery cell is used, for instance, in a mobile telephone, a laptop or the like. As an alternative, such a lithium battery cell is used for a battery, especially for a traction battery, of an electrically powered motor vehicle. Here, for example, several such battery cells are electrically connected in series and/or in parallel to each other, whereby the traction battery supplies a current and/or a voltage for an electric motor that is configured to propel the motor vehicle.

Another aspect of the invention relates to a method for producing a secondary particle that is configured according to one of the variants described above.

To start with, an aqueous solution of a transition metal salt is produced or provided in a first step. In a subsequent second step, a base is added to the aqueous solution, thereby carrying out a precipitation reaction. Here, this precipitation reaction serves to form crystallization nuclei from a corresponding transition metal compound. Therefore, these crystallization nuclei form the precipitate from the precipitation reaction. In this context, the term crystallization nucleus refers to a crystal from the transition metal compound whose diameter is less than 200 nm, preferably between 50 and 150 nm, especially preferably between 75 and 125 nm. These crystallization nuclei can have a relatively large extension in the crystallographic a-b plane.

After an appropriate period of time, the precipitation reaction is then interrupted or terminated, for example, through the addition of an acid, that is to say, by raising the pH value of the aqueous solution.

According to a first variant of the method, in a third step, the crystallization nuclei that have resulted from the precipitation reaction are doped with monovalent cations, especially on the (100) and/or on the (110) crystal surfaces. Such doping methods are already known from the state of the art. Preferably, hydrogen cations ($H^+$), sodium cations ($Na^+$), potassium cations ($K^+$) or ammonium ions ($NH_4^+$) are used for the doping. This doping reduces the surface energy of the crystal surfaces that are oriented in parallel to the crystallographic c-axis, especially the (100) crystal surfaces, the (010) crystal surfaces and/or the (110) crystal surfaces.

In particular, for purposes of the doping, an excess of these cations, advantageously in the form of a salt, is added to the aqueous solution containing the crystallization nuclei.

Subsequently, in a fourth step, the precipitation reaction is continued or else another precipitation reaction is initiated. For this purpose, if applicable, a base is added to the solution. Within the scope of this, the crystallization nuclei from the transition metal compound continue to grow, although, due to the doping, a growth in the direction of the crystallographic c-axis is relatively large, especially on the (100) crystal surfaces, on the (010) crystal surfaces and/or on the (110) crystal surfaces, so that the precursor particles formed during this precipitation reaction are larger in the direction of their crystallographic c-axis than in a direction perpendicular to this direction.

According to a second variant of the method, in an alternative third step, the crystallization nuclei are coated, especially on their (100) crystal surfaces, on their (010) crystal surfaces and/or on their (110) crystal surfaces. Such coating methods are already known from the state of the art. Such a coating is formed or produced, for instance, on the basis of an organic compound, especially bitumen, a polyisoprene or a preferably oxidizable nano-powder. As an alternative or in addition to this, inorganic compounds such as $AL_2O_3$, $ZrO_2$, $ZnO$, $SrCrO_4$ can be used.

Analogously to the fourth step of the first variant, in a fourth step according to the second variant, the precipitation reaction is continued or else another precipitation reaction is initiated. Consequently, a growth in the direction of the crystallographic c-axis is relatively large due to the coating, especially on the (100) crystal surfaces, on the (010) crystal surfaces and/or on the (110) crystal surfaces.

According to an alternative third variant of the method, the crystallization nuclei are uniaxially compressed in the third step. The crystallization nuclei are anisotropic owing to their crystal structure. In particular, they have a relatively low stiffness, that is to say, a relatively great deformability, in the direction of their crystallographic c-axis. For this reason and, if applicable, to the extent that the crystallization nuclei have a relatively large extension in their a-b crystal plane, the crystallization nuclei preferably orient themselves under the effect of the pressure used for the compression in such a way that their crystallographic c-axis is oriented in the direction of the effect of the uniaxial pressure or compression. For example, the crystallization nuclei are used in the solution or in a solution. As an alternative to this, the crystallization nuclei are removed from the solution before the compression and advantageously washed and dried.

In a fourth step according to the third variant, the oriented crystallization nuclei are sintered. In particular, the sintering process is carried out for a period of 8 to 12 hours, especially for a period of 10 hours, and at a temperature between 700° C. and 1200° C., preferably at a temperature of 1000° C. For example, the uniaxial compression is carried out repeatedly during the sintering process.

Owing to the orientation of the crystallization nuclei, the crystallization nuclei are preferably bonded to their (001) crystal surfaces during the sintering. Consequently, this bonding forms precursor particles whose extension in the direction of their crystallographic c-axis, that is to say, perpendicular to the (001) crystal surface, is relatively large in comparison to the crystallization nuclei, relative to their extension in a direction perpendicular thereto. If necessary, the third and/or fourth step can be repeated.

In a fifth step, also shared by the first, second and third variant of the method, the precursor particles are calcinated and then advantageously sintered. The secondary particles formed in this manner can then be advantageously comminuted to a prescribed size or to a prescribed size range.

BRIEF DESCRIPTION OF THE DRAWINGS

Below, embodiments of the invention will be explained in greater detail with reference to a drawing. The following is shown.

Parts and dimensions that correspond to each other are always provided with the same reference numerals in all of the figures.

DETAILED DESCRIPTION OF THE INVENTION

Figure 1:
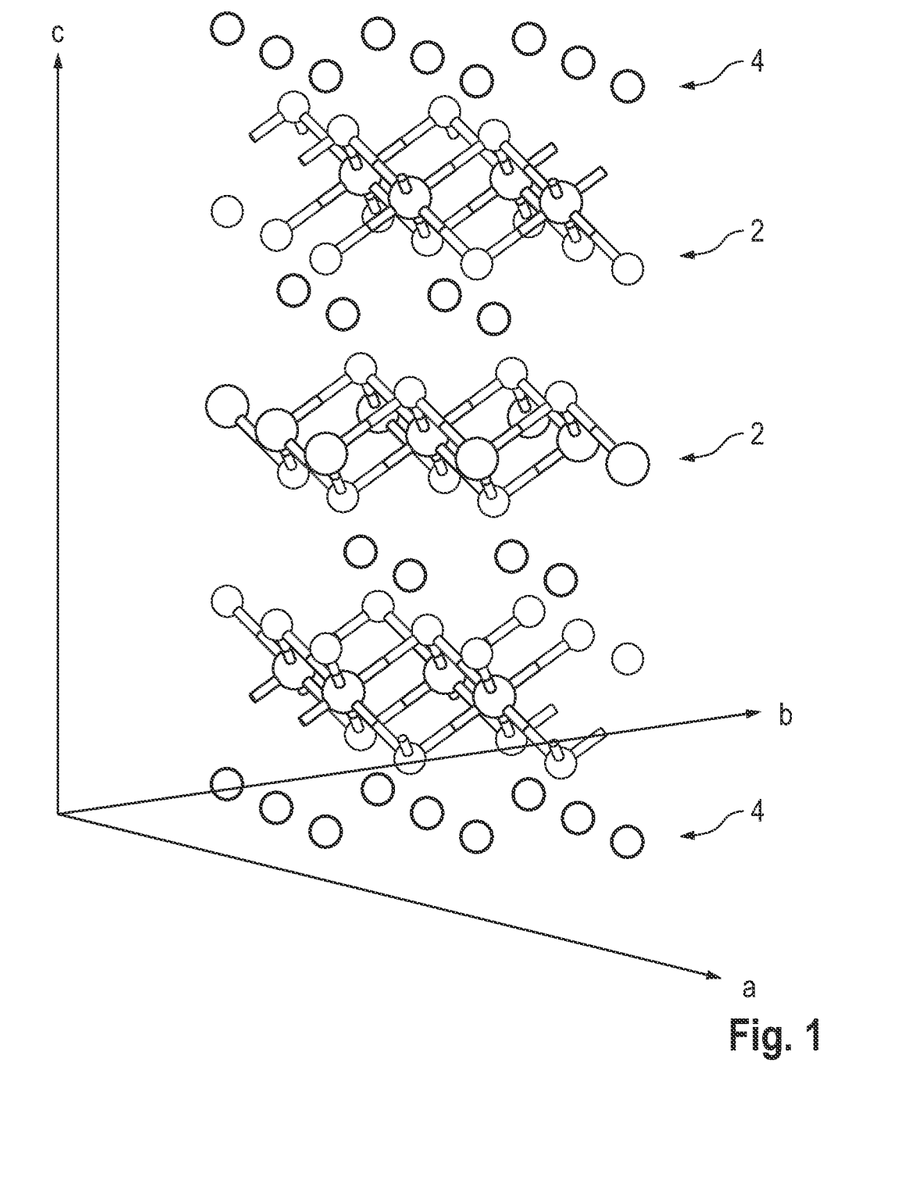
FIG. 1 is a schematic view of the crystal structure of a lithium transition metal oxide compound in which transition metal oxide layers and lithium layers alternate, whereby the crystallographic c axis is oriented perpendicular to these layers.

FIG. 1 shows a crystal structure of a lithium transition metal oxide. It has a layered structure made up of alternating layers of a transition metal oxide—below referred to as transition metal [sic] layers 2—and layers of lithium ions—below referred to as lithium layers 4—arranged one above the other. In other words, the lithium layers 4 and the transition metal oxide layers are arranged alternately one above the other.

Moreover, FIG. 1 shows the orientation of the crystallographic a-axis, of the crystallographic b-axis and of the crystallographic c-axis. These axes are designated with the reference letters a, b and c. Here, the crystallographic c-axis is oriented perpendicular to the layers 2 and 4. The planes that are spanned by the transition metal [sic] layers 2 and the lithium layers 4 run parallel to each other here. In other words, the crystallographic c-axis is normal relative to one of the transition metal oxide layers 2 or one of the lithium layers 4. The transition metal oxide layers 2 are each arranged in a plane spanned by the crystallographic a-axis and the crystallographic b-axis of the unit cell.

Figure 2:
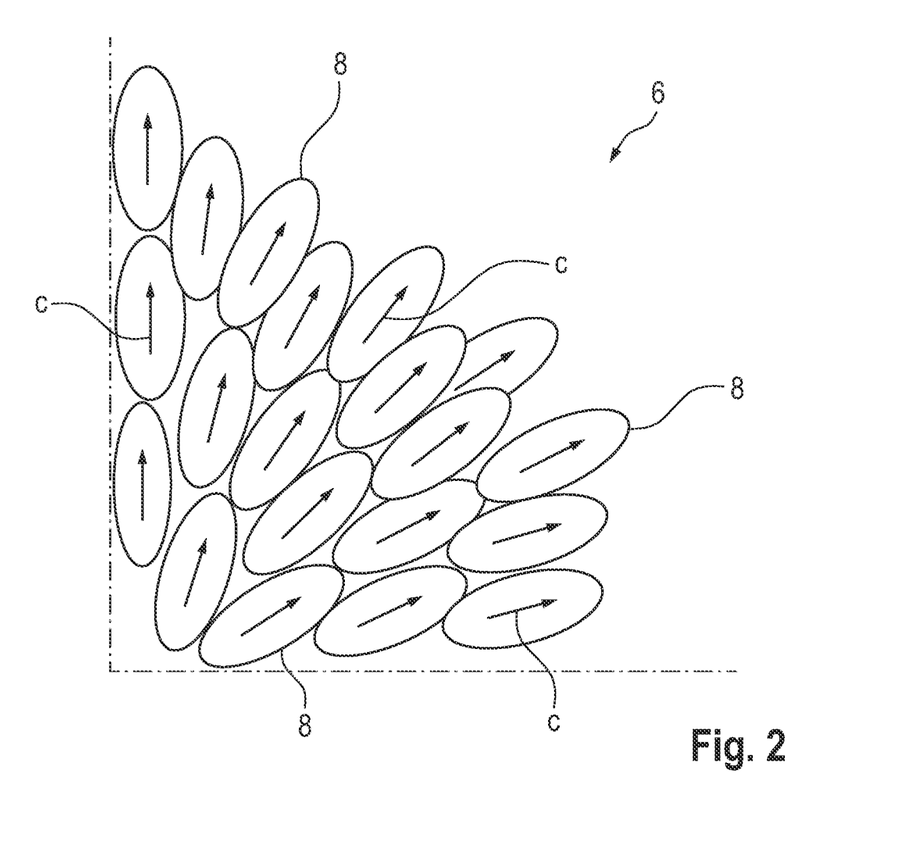
FIG. 2 is a schematic and partial sectional view of a secondary particle with a plurality of primary particles, whereby the primary particles are elongated along their crystallographic c axis.

FIG. 2 shows sections of an essentially spherical secondary particle 6 that is made up of a plurality of agglomerated primary particles 8 of a lithium transition metal oxide. Here, these primary particles have a crystal structure as shown in FIG. 1. For each of the primary particles 8, the direction of this crystallographic c-axis is indicated by an arrow. Here, the primary particles 8 are elongated in the direction of their crystallographic c-axis. In other words, they have an extension in the direction of the crystallographic c-axis that is greater than in a direction perpendicular to this axis. In this context, the crystallographic c-axis corresponds to the major direction of extension, that is to say, the longest semi-axis, of the appertaining primary particle.

The primary particles 8 each have an extension between 100 nm and 3 μm in the direction of their crystallographic c-axis. Here, the spatial extension in the direction of the crystallographic c-axis is more than 1.2 times the extension of the primary particle 8 in a direction perpendicular to its axis. Preferably, they have an aspect ratio between 1:1.2 and 1:5 (extension perpendicular to the c-axis:extension in the direction of the c-axis).

As can also be seen in FIG. 2, the primary particles 8 are morphologically radially oriented. In other words, the primary particles are oriented in such a way that their major direction of extension or their crystallographic c-axis is oriented starting from a core of the secondary particle 6 towards an outer edge of the secondary particle 6.

According to another variant of the secondary particle (not shown here), its primary particles 8 are not configured as an ellipsoid but rather they have a prismatic or cylindrical shape. Here, the major direction of extension is the height direction of the prism/cylinder.

The primary particles 8 shown in FIG. 2 are relatively homogenous in terms of the sizes and the aspect ratios of the primary particles. According to another variant of the secondary particles (not shown here), however, the sizes and/or aspect ratios of the primary particles are more uniformly distributed over a range of 50 nm and 5 μm in terms of the size and between 1:1.2 and 1:5 in terms of the aspect ratio.

According to another variant of the secondary particle 6 (not shown here), its primary particles 8 are not oriented radially but rather are oriented (aligned) randomly in the circumferential direction of the secondary particle 6.

Such secondary particles are used especially for a cathode of a secondary lithium battery cell.

Figure 3:
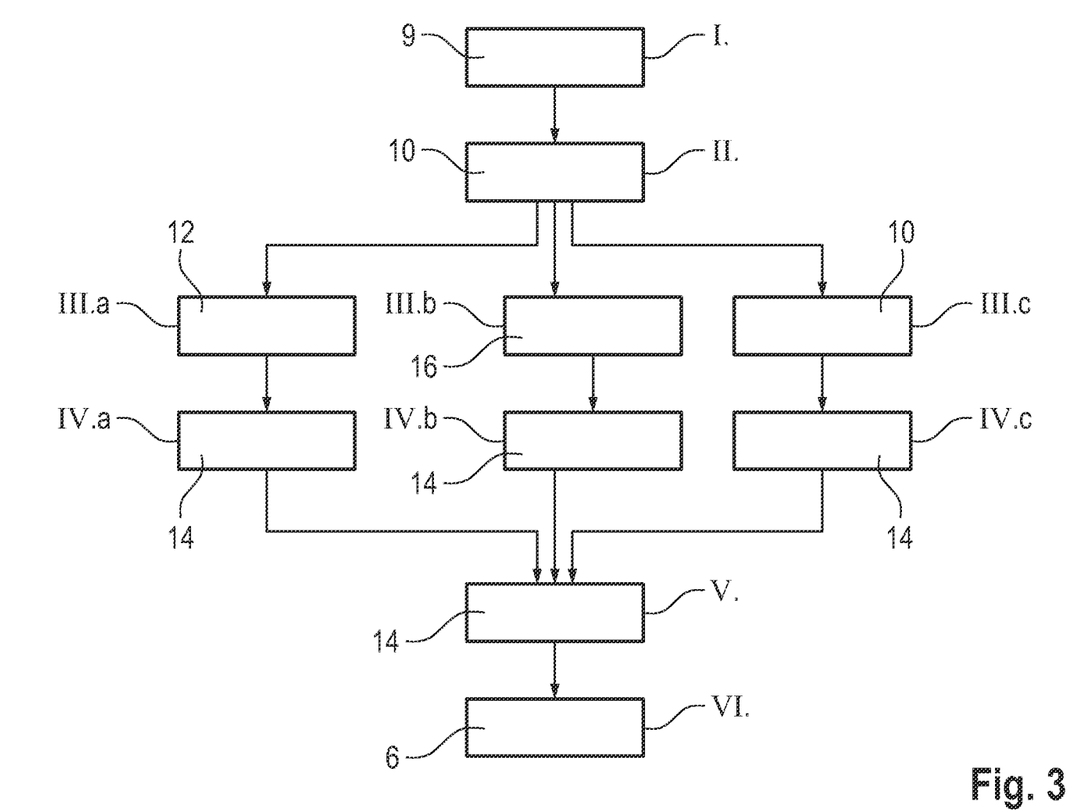
FIG. 3 is a flow diagram which depicts a method for producing the secondary particle.

FIG. 3 shows a flow diagram that represents a method for producing such a secondary particle 6, especially a plurality of such secondary particles 6.

To start with, in a first step I., an aqueous solution 9 of a transition metal salt is produced or provided. For the production, for example, one or more transition metal sulfates, especially $NiSO_4 \cdot 6H_2O$, $MnSO_4 \cdot H_2O$ or $CoSO_4 \cdot 7H_2O$, are added to an aqueous solution made up of ethylene glycol and demineralized water.

In a subsequent second step II., in order to form crystallization nuclei 10 having a diameter less than 200 nm, preferably between 50 nm and 150 nm, especially preferably between 75 nm and 125 nm, a (first) precipitation reaction is carried out by adding a base, for example, NaOH or $NH_4OH$. Here, the pH value is preferably selected between 8 and 13, preferably at 11, and advantageously kept constant. Here, a stirring speed amounts to between 500 and 200 rpm at an ambient pressure between 1 and 5 atm (atmospheric pressure), preferably at 1 atm. Depending on the transition salt and on the stoichiometry employed, the temperature of the solution is advantageously selected between 20° C. and 95° C. For example, the temperature is set a 80° C. for the production of NMC111 and at 40° C. for the production of NMC811.

If the crystallization nuclei have a prescribed target size (preferably between 50 nm and 150 nm, especially preferably between 75 nm and 125 nm), the precipitation reaction is interrupted. For this purpose, the pH value is lowered.

According to a first variant of the method, in a third step III.a, the crystallization nuclei 10 that have resulted from the precipitation reaction are doped with monovalent cations 12 on their (100) crystal surfaces, on their (010) crystal surfaces and/or on the (110) crystal surfaces. The doping is preferably carried out in the aqueous solution 9. However, if the doping process requires this, the crystallization nuclei 10 are advantageously removed from the aqueous solution 9 before the doping, and preferably washed and dried. Moreover, hydrogen cations ($H^+$), sodium cations ($Na^+$), potassium cations ($K^+$) or ammonium ions ($NH_4^+$) are used for this purpose. Owing to the excess of these ions and/or owing to the exposed position of the oxygen of the crystallization nuclei, preferably the (100) crystal surfaces, the (010) crystal surfaces or the (110) crystal surfaces are doped.

For this purpose, an excess of these cations 12, advantageously in the form of a salt, is added to the aqueous solution that contains the crystallization nuclei.

Subsequently, in a fourth step IV.a, the precipitation reaction is continued by adding a base, that is to say, by raising the pH value to a range between 8 and 13, or else another (second) precipitation reaction is initiated. Consequently, the crystallization nuclei continue to grow from the transition metal compound, thus forming precursor particles 14. However, since the surface energy on the (100) crystal surfaces, on the (010) crystal surfaces and/or on the (110) crystal surfaces is reduced due to the doping, a growth of the appertaining crystal in the direction of its crystallographic c-axis is greater than in a direction perpendicular to this direction.

According to an alternative second variant of the method, in a third step III.b, the crystallization nuclei 10 are coated on their (100) crystal surfaces, on their (010) crystal surfaces and/or on their (110) crystal surfaces. Preferably, the coating takes place in the aqueous solution 9. However, if the coating process requires this, the crystallization nuclei 10 are advantageously removed from the aqueous solution 9 before being coated, and preferably washed and dried. Such a coating 16 can make use of an organic compound, for example, bitumen, or a polyisoprene. As an alternative to this, a preferably oxidizable nano-powder is used which especially has a diameter that constitutes 1/10 to 1/3 of the surface of the (100) crystal surface, the (010) crystal surfaces and/or the (110) crystal surface. As another alternative, inorganic compounds such as $AL_2O_3$, $ZrO_2$ can be used. Additional examples of a suitable inorganic compound are ZnO or $SrCrO_4$, whereby, 0.05 mol to 0.2 mol, preferably 0.1 mol per mol of transition metal salt is used for an excess of Zn or of Cr. Owing to the excess and/or owing to the exposed position of the oxygen of the crystallization nuclei, preferably the (100) crystal surfaces, the (010) crystal surfaces or the (110) crystal surfaces are doped.

The fourth step IV.b according to the second variant of the method is carried out analogously to the fourth step IV.a according to the first variant. Owing to the coating, the surface energy of the (100) crystal surfaces, of the (010) crystal surfaces and/or of the (110) crystal surfaces is likewise reduced, so that a relatively fast crystal growth is achieved along the crystallographic c-axis of the appertaining crystallization nucleus 10 during the second precipitation reaction or during the continuation of the first precipitation reaction.

According to an alternative third variant of the method, in a third step III.c the crystallization nuclei 10 are compressed uniaxially. Advantageously, the crystallization nuclei 10 are first removed from the aqueous solution, preferably washed and dried. Subsequently, the crystallization nuclei 10 are subjected to a uniaxial pressure, that is to say, a pressure that is exerted along one single direction.

Due to their anisotropy, the crystallization nuclei 10 preferably orient themselves under the effect of the pressure used for the compression in such a way that their crystallographic c-axis is oriented in the direction of the effect of the uniaxial pressure or compression.

In a fourth step IV.c according to the third variant, the oriented crystallization nuclei are sintered. Here, the sintering process is carried out for a period of 8 to 12 hours, especially for a period of 10 hours, and at a temperature between 700° C. and 1200° C., preferably at a temperature of 1000° C. The uniaxial compression is carried out repeatedly during the sintering process.

Owing to the orientation of the crystallization nuclei, the crystallization nuclei are preferably bonded to their (001) crystal surfaces during the sintering. Consequently, this bonding forms precursor particles 14 whose extension in the direction of their crystallographic c-axis, that is to say, perpendicular to the (001) crystal surface, is relatively large in comparison to the crystallization nuclei, relative to their extension in a direction perpendicular thereto. If necessary, the third and/or fourth step can be repeated.

In FIG. 3, the third and the fourth step for the first variant of the method are designated with the reference numerals III.a or IV.a, for the second variant of the method with the reference numerals III.b or IV.b, and for the third variant of the method with the reference numerals III.c or IV.c.

Advantageously, the precursor particles 14 are first washed, filtered and dried, for example, at a temperature between 100° C. and 110° C. Subsequently, the precursor particles 14 are calcinated in a fifth step V. For this purpose, the precursor particles 14 are first mixed with a lithium salt, especially $Li_2CO_3$ or LiOH. Advantageously, the mixing is carried out under standard conditions (25° C. ambient temperature and 1013 mbar ambient pressure) and at a stoichiometric ratio of Li (from the lithium salt) to the transition metal oxide of, for instance, 1.05:1 to 1.20:1, preferably at a stoichiometric ratio of 1.10:1. Thus, a lithium excess is achieved. The subsequent calcination is carried out especially at a temperature between 350° C. and 600° C., preferably at 450° C., for one hour. Preferably, this is done using an oxygen atmosphere.

Subsequently, a sintering process of the calcinated precursor particles (sixth step VI.) is carried out. The sintering process is carried out at a temperature between 700° C. and 1000° C., preferably at 800° C., for a period of 10 hours.

Due to the calcinating and/or the sintering, if applicable, the doping elements or compounds are removed, or else the coating, especially if it is based on an organic compound, is burned or degraded to form carbon. Due to this degradation of the coating, electrically non-conductive coatings can also be advantageously used for the production process.

The secondary particles created during the sintering can subsequently be comminuted by grinding, for example, using an air jet mill, at an air speed between 200 m/s and 400 m/s, to a prescribed size or to a prescribed size range.

The invention is not limited to the embodiment described above. Rather, other variants of the invention can also be derived by the person skilled in the art without departing from the subject matter of the invention. In particular, all of the individual features described in conjunction with the individual embodiments can also be combined in another manner without departing from the subject matter of the invention.

LIST OF REFERENCE NUMERALS

2 transition metal oxide layer
4 lithium layer
6 secondary particle
8 primary particle
9 aqueous solution
10 crystallization nucleus
12 cations
14 precursor particles
16 coating
I. producing/providing an aqueous solution of a transition metal salt
II. carrying out a precipitation reaction
III.a doping
III.b coating
III.c compressing
IV.a carrying out a precipitation reaction
IV.b carrying out a precipitation reaction
IV.c sintering
V. calcinating
VI. sintering
a crystallographic a-axis
b crystallographic b-axis
c crystallographic c-axis

The invention claimed is:
1. A secondary particle for a cathode of a secondary lithium battery cell, comprising a plurality of primary particles, whereby each of the primary particles has a layered crystalline structure in which transition metal oxide layers and lithium layers alternate, wherein each of the primary particles has an extension in the direction of its crystallographic c-axis that is greater than in a direction perpendicular to the crystallographic c-axis.

2. The secondary particle according to claim 1, wherein the spatial extension of the primary particles in the direction of the crystallographic c-axis is at least 1.2 times the extension of the primary particle in the direction perpendicular to the crystallographic c-axis.

3. The secondary particle according to claim 2, wherein the spatial extension of the primary particles in the direction of the crystallographic c-axis is at least two times the extension of the primary particle in the direction perpendicular to the crystallographic c-axis.

4. The secondary particle according to claim 1, wherein the crystallographic c-axis is parallel to a major direction of extension of the appertaining primary particle.

5. The secondary particle according to claim 1, wherein the primary particles are morphologically radially oriented.

6. The secondary particle according to claim 1, wherein each of the primary particles has a spatial extension between 50 nm and 5 μm.

7. A cathode for a secondary lithium battery cell, comprising a secondary particle that is configured according to claim 1.

8. A secondary lithium battery cell having a cathode according to claim 7.

9. A method for producing a secondary particle according to claim 1, comprising:
providing an aqueous solution of a transition metal salt,
in order to form crystallization nuclei from a transition metal compound, carrying out a precipitation reaction by adding a base to the aqueous solution,
doping the crystallization nuclei that have resulted from the precipitation reaction with monovalent cations,
carrying out another precipitation reaction, thus forming precursor particles from the doped crystallization nuclei, and
calcinating the precursor particles.

10. The method for producing a secondary particle according to claim 1, comprising:
providing an aqueous solution of a transition metal salt,
in order to form crystallization nuclei from a transition metal compound, carrying out a precipitation reaction by adding a base to the aqueous solution,
coating the crystallization nuclei that have resulted from the precipitation reaction,
carrying out another precipitation reaction, thus forming precursor particles from the coated crystallization nuclei, and
calcinating the precursor particles.

11. The method for producing a secondary particle according to claim 1, comprising:
providing an aqueous solution of a transition metal salt,
in order to form crystallization nuclei from a transition metal compound, carrying out a precipitation reaction by adding a base to the aqueous solution,
orienting the crystallization nuclei that have resulted from the precipitation reaction relative to each other by means of uniaxial compression and sintering the crystallization nuclei, thus forming precursor particles, and
calcinating the precursor particles.

* * * * *